No. 873,980. PATENTED DEC. 17, 1907.
C. A. BARWISE.
COFFEE AND TEA URN.
APPLICATION FILED MAR. 21, 1907.
2 SHEETS—SHEET 1
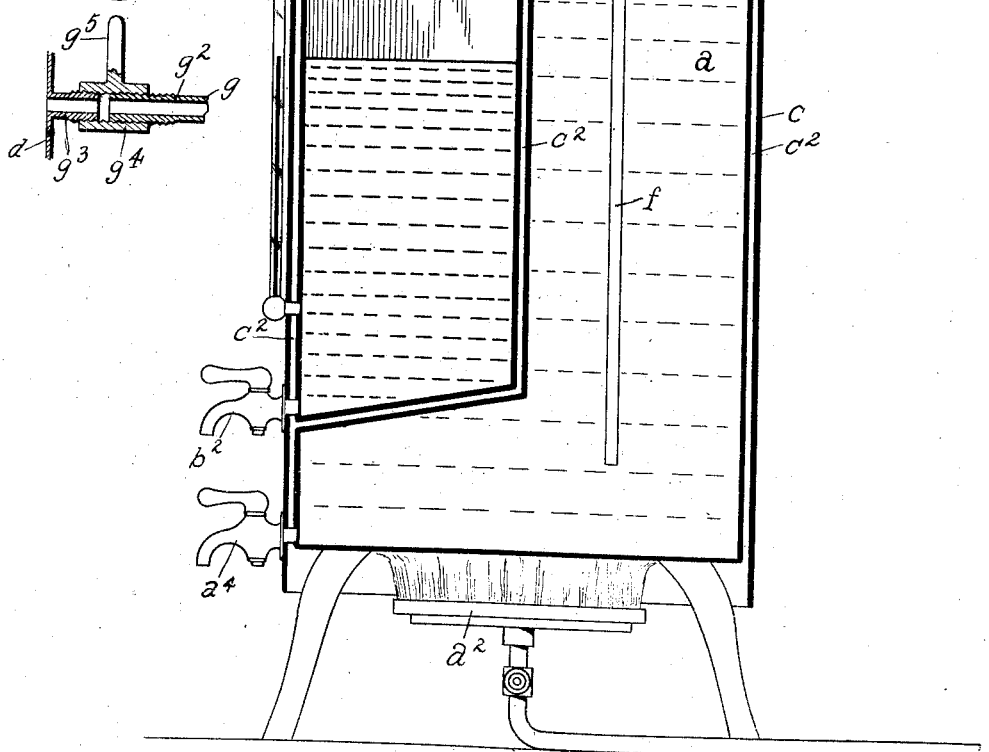

No. 873,980. PATENTED DEC. 17, 1907.
C. A. BARWISE.
COFFEE AND TEA URN.
APPLICATION FILED MAR. 21, 1907.
2 SHEETS—SHEET 2.
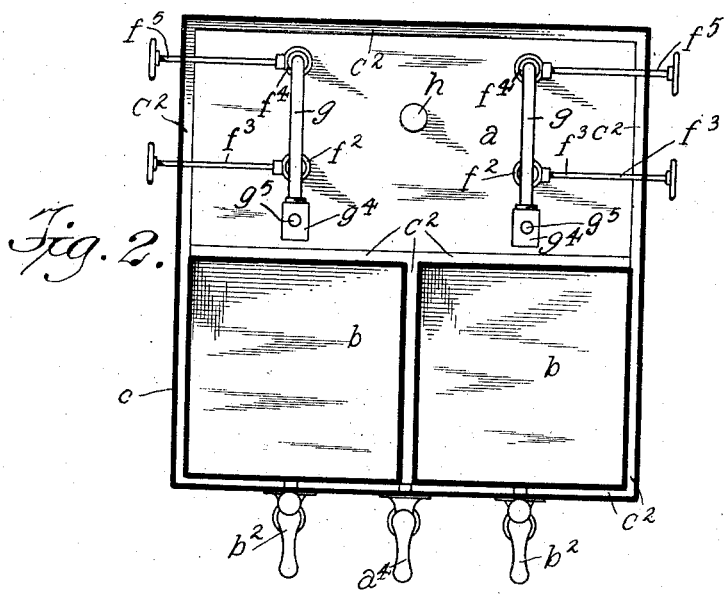
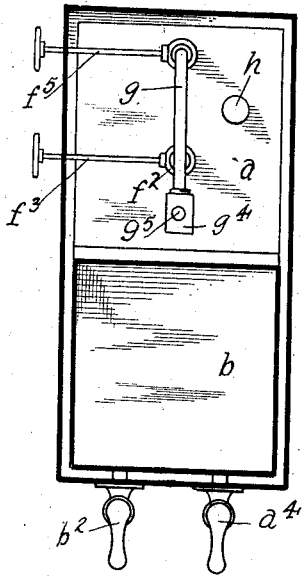
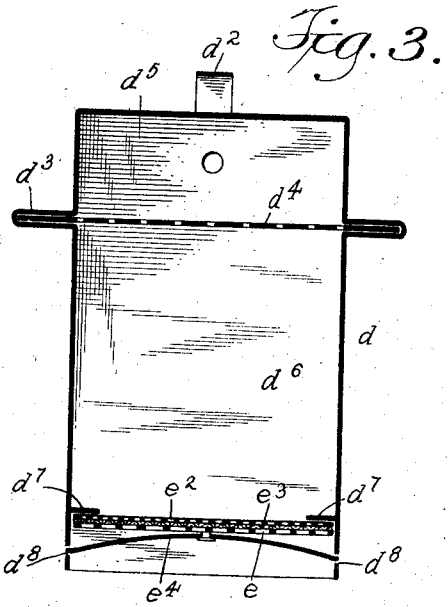
WITNESSES
INVENTOR
Charles A. Barwise
BY
ATTORNEYS

UNITED STATES PATENT OFFICE.

CHARLES A. BARWISE, OF BROOKLYN, NEW YORK.

COFFEE AND TEA URN.

No. 873,980.  Specification of Letters Patent.  Patented Dec. 17, 1907.

Application filed March 21, 1907. Serial No. 363,546.

*To all whom it may concern:*

Be it known that I, CHARLES A. BARWISE, a citizen of the United States, and residing at Brooklyn, in the county of Kings and State of New York, have invented certain new and useful Improvements in Coffee and Tea Urns, of which the following is a specification, such as will enable those skilled in the art to which it appertains to make and use the same.
This invention relates to coffee and tea urns and particularly to devices of this class used in cafés, restaurants, hotels and like places; and the object of the invention is to provide an improved device of this class whereby the perfect extraction of the liquid infusion of coffee or tea is accomplished and the said infusion rendered clear and perfect as a beverage; a further object being to utilize the heat of a water boiler which forms a part of the device to maintain the liquid coffee or tea at the desired temperature; a further object being to provide a coffee or tea urn the operation of which is made continuous by an arrangement of two or more liquid coffee containing jars or vessels in connection with a single boiler, so that while one jar or vessel is being depleted the other or others are being replenished so that said jars or vessels can be used alternately without experiencing any temporary failure in the supply of coffee or tea; a further object being to dispense with the cloth bag usually employed in connection with apparatus of this class and in which the coffee or tea to be infused is placed, together with other details of such apparatus made necessary by the use of said bag and the objections to which are well known; and with these and other objects in view the invention consists in a device of the class specified constructed as hereinafter described and as pointed out in the appended claims.

The invention is fully disclosed in the following specification, of which the accompanying drawing forms a part, in which the separate parts of my improvement are designated by suitable reference characters in each of the views, and in which;

Figure 1 is a sectional side view of a coffee or tea urn made according to my invention and in which two coffee jars or vessels are employed in connection with a single boiler; Fig. 2 a sectional plan view with the coffee jars or vessels removed; Fig. 3 a sectional side view of one of the coffee jars or vessels detached or removed from the urn; Fig. 4 a view similar to Fig. 2 but showing a single form of device or a device involving but one coffee or tea jar or vessel; and, Fig. 5 a sectional side view of a coupling device shown at the top of Fig. 1.

In the practice of my invention, as shown in Figs. 1 to 3 inclusive, I provide a boiler $a$, which is capable of withstanding considerable pressure and which may be heated by a steam coil, gas, electricity or in any other way, but, in the form of construction shown, is heated by an ordinary gas burner $a^2$ which is placed thereunder. The upper front portion of the boiler is cut away or provided with a recess $a^3$ which extends to the top thereof and from one side to the other, and to a predetermined distance from the bottom thereof and in which, in practice, are placed the liquid coffee jars or vessels $b$, two of which are shown.

The boiler $a$ and the liquid coffee jars or vessels $b$ when connected are rectangular in cross section and all of said parts are inclosed by a main outer casing $c$ which preferably extends slightly below the boiler and also slightly above the same and, in the form of construction shown, the liquid coffee containing jars or vessels $b$ also extend above the top of the boiler and parallel with the top of the casing $c$, and between said casing and the boiler, and between the jars or vessels $b$, and between said jars or vessels and the boiler and between the fronts of the jars or vessels and the front of the casing $c$ are air spaces $c^2$ in which the air is free to circulate, and through which the hot gases of combustion from the burner pass. The bottom of the boiler $a$ is provided at the front thereof with a faucet $a^4$ by which the contents thereof may be drawn off when desired, and each of the vessels or jars $b$ is provided also with a faucet $b^2$ for drawing off coffee or tea when desired.

In the top of each of the liquid coffee jars or vessels $b$ is placed what I call a digester $d$ in which the ground coffee or other material is placed, and each of which consist of a suitable vessel or receiver provided at the top with a handle $d^2$ and near the top with a flange $d^3$, and the flanges $d^3$ of the digesters $d$ support said digesters on the tops of the liquid coffee or tea jars or vessels $b$ and said digesters are preferably of less dimensions in transverse section than the said jars or vessels $b$, and the digesters $d$ and the flanges $d^3$ thereof serve as covers for closing the tops of the jars or vessels $b$ and keep the steam and aroma from escaping from the said jars or vessels.

The air spaces $c^2$ prevent the boiler from overheating the coffee or tea in the jars or vessels $b$ which are kept at a proper temperature by a current of hot air from the burner $a^2$ passing upward through said air spaces and the heat from the boiler $a$ also aids in retaining the contents of the jars or vessels $b$ at a proper temperature.

The digesters $d$ are provided at a predetermined distance below the top thereof with finely perforated partition plates $d^4$ above which are chambers $d^5$ into which hot water from the boiler is discharged, as hereinafter described, and below the partitions $d^4$ are chambers $d^6$ in which the coffee or other material is placed and the bottoms of the chambers $d^6$ consist of perforated plates $e$ and $e^2$ between which is placed a fabric screen $e^3$, and the sides of the digesters are provided with inwardly directed stops or flanges $d^7$, and the bottom perforated plate $e$ is provided with strong springs $e^4$ which are pivoted thereto and the ends of which are adapted to pass through slots $d^8$ in the opposite sides of the digesters, and by means of this construction, by turning the springs $e^4$ the bottoms of the chambers $d^6$ may be taken out whenever desired and the perforated plates $e$ and $e^2$ cleaned and the fabric screen may also be cleaned or a new one substituted for the old one whenever desired. It will also be understood that in placing the ground coffee or other material in the chambers $d^6$ of the digesters $d$, the bottoms of the chambers $d^6$ are taken out and the digesters inverted and said chambers $d^6$ are filled through the bottoms of the digesters.

In the form of construction shown, the boiler $a$ is provided with two tubes $f$ which extend downwardly thereinto nearly to the bottom thereof and which also extend out through the top thereof, and these tubes $f$ communicate with elbow tubes $g$ which communicate with the top portion of the boiler $a$ and which comprise vertically and horizontally arranged members or arms. The tubes $f$ communicate with the horizontally arranged members or arms of said elbow tubes $g$, and the horizontally arranged members or arms of the elbow tubes $g$ extend in the direction of the top portion of the digesters $d$ and are threaded as shown at $g^2$, a detail of this construction being shown in Fig. 5, and the said digesters are provided with threaded nozzles $g^3$, and mounted on the threaded ends $g^2$ of the tubes $g$ are interiorly threaded coupling sleeves $g^4$ provided with handles $g^5$, and by turning the coupling sleeves $g^4$ in one direction the connection with the nozzles $g^3$ may be broken and the digesters $d$ may thus be removed or placed in position whenever desired, it being understood that by turning the coupling sleeves $d^4$ in the opposite direction the nozzles $g^3$ and tubes $g$ may be coupled together.

The tubes $f$ are provided with valve casings $f^2$ having valves operated by valve stems $f^3$, and the vertically arranged part of the elbow tubes $g$ are provided with similar valve casings $f^4$ and valves operated by valve stems $f^5$, and when the water in the boiler $a$ is heated, pressure in said boiler will be generated which will force the water through the tubes $f$ into the chambers $d^5$ of the digesters $d$ and this water passes through the perforated plates or screens $d^4$ in the top portions of the digesters and onto the coffee or other material in the chambers $d^6$, and when a sufficient amount of water has thus been discharged in the digesters $d$, the valve stems $f^3$ may be operated to close the valves in the valve casings $f^2$ and the valves in the valve casings $f^4$ may be opened by means of the valve stems $f^5$ to permit steam from the boiler to enter the digesters. This steam exerts pressure on the water and coffee or other material in the digesters and the water is forced through said material and the infusion thus formed is driven downwardly through the perforated plates $e$ and $e^2$ and fabric screens or filters $e^3$ into the liquid jars or vessels $b$.

The boiler is provided with a pressure gage $h$ placed in communication therewith by means of a pipe $h^2$ and any suitable safety valve device may be provided if desired, and the jars or vessels $b$ are also provided with gage tubes $i$ to determine the height of the liquid therein.

In practice, the boiler $a$ is filled with water preferably to about three-quarters of its capacity. The coffee or other material is placed in the digesters $d$, as hereinbefore described, and said digesters are placed in position. The valves in the tubes $f$ are then opened and water from the boiler is allowed to pass into the top portion of the digesters. When the gages $i$ indicate that sufficient liquid coffee has been made, the water is turned off and the steam turned into the top portions of the digesters $d$ and the steam is admitted to said digesters until all the liquid has been forced out of the coffee or other material therein, and before renewing the operation the digester should be thoroughly cleaned and new material placed therein.

It will be understood, of course, that when an apparatus of the class shown in Figs. 1 to 3 inclusive is employed, the separate parts thereof may be operated separately and in this manner coffee and tea may be continually produced, but if desired, a single form of apparatus, as shown in Fig. 4, may be employed, and in this case the construction is exactly similar to that shown in Figs. 1 to 3 inclusive except that the boiler is smaller and only one of the coffee or tea containing jars or vessels b is employed and only one of the digesters d.

A horizontal plan of the urn is preferably either square or oblong depending upon the number of jars or cans or coffee containers employed, but my invention is not absolutely limited to an apparatus of the class described which is rectangular in cross section.

As constructed it will be seen that the entire apparatus consists of a simple arrangement of parts combined in a single casing and comprising a boiler, coffee containing jars or vessels and the other appliances herein shown and described.

Having fully described my invention, what I claim as new and desire to secure by Letters Patent, is:—

1. An apparatus of the class described, comprising an upright boiler, in the front top portion of which is a vertically arranged recess, and the area of the base being greater than the area of the top, a liquid coffee jar or vessel placed vertically in said recess, a ground coffee receiver placed detachably in the top of the liquid coffee jar or vessel and forming a cover therefor, tubes forming a communication between the boiler and the top portion of the receiver and a casing inclosing said boiler and said liquid coffee jar or vessel and open at the top and bottom.

2. An apparatus of the class described, comprising an upright boiler, in the front top portion of which is a vertically arranged recess, and the area of the base of which is greater than the area of the top, a liquid coffee jar or vessel placed vertically in said recess, a ground coffee receiver placed detachably in the top of the liquid coffee jar or vessel and forming a cover therefor, a tube forming a communication between the top portion of the boiler and the top portion of the receiver, another tube communicating with the bottom portion of the boiler and with the first named tube, and means for detachably connecting the first named tube with the receiver.

3. An apparatus of the class described, comprising an upright boiler, in the front top portion of which is a vertically arranged recess, and the area of the base of which is greater than the area of the top, a liquid coffee jar or vessel placed vertically in said recess, a ground coffee receiver placed detachably in the top of the liquid coffee jar or vessel and forming a cover therefor, a tube forming a communication between the top portion of the boiler and the top portion of the receiver, another tube communicating with the bottom portion of the boiler and with the first named tube, and means for detachably connecting the first named tube with the receiver, all of said parts being inclosed within a casing between which and the boiler and the coffee jar or vessel are air spaces.

4. An apparatus of the class described, comprising an upright boiler, in the front top portion of which is a vertically arranged recess, and the area of the base of which is greater than the area of the top, a liquid coffee jar or vessel placed vertically in said recess, a ground coffee receiver placed detachably in the top of the liquid coffee jar or vessel and forming a cover therefor, a tube forming a communication between the top portion of the boiler and the top portion of the receiver, another tube communicating with the bottom portion of the boiler and with the first named tube, and means for detachably connecting the first named tube with the receiver, all of said parts being inclosed within a casing between which and the boiler and the coffee jar or vessel are air spaces, and a similar air space being formed between the boiler and the coffee jar or vessel.

5. An apparatus of the class described, comprising an upright boiler, in the front top portion of which is a vertically arranged recess, and the area of the base of which is greater than the area of the top, liquid coffee jars or vessels placed vertically in said recess, coffee receivers detachably placed in the top of the liquid coffee jars or vessels and forming a cover therefor, tubes communicating with the top portion of the boiler and with the top portions of the coffee receivers, other tubes communicating with the bottom portion of the boiler and with the first named tubes, and means for detachably connecting the first named tubes with the coffee receivers.

6. An apparatus of the class described, comprising an upright boiler, in the front top portion of which is a vertically arranged recess, and the area of the base of which is greater than the area of the top, liquid coffee jars or vessels placed vertically in said recess, coffee receivers detachably placed in the top of the liquid coffee jars or vessels and forming a cover therefor, tubes communicating with the top portion of the boiler and with the top portions of the coffee receivers, other tubes communicating with the bottom portion of the boiler and with the first named tubes, and means for detachably connecting the first named tubes with the coffee receivers, said coffee receivers being divided into top and bottom chambers by perforated partitions and the bottom partition being removable.

7. In an apparatus of the class described, an upright boiler which is rectangular in cross section, and in the front top portion of which is a vertically arranged recess, a liquid coffee vessel placed in said recess and rectangular in cross section and the transverse dimensions of which in connection with the transverse dimensions of the top portion of the boiler are equal to the transverse dimensions of the bottom portion of the boiler, a ground coffee receiver detachably placed in the top portion of the liquid coffee vessel and forming a cover therefor, and divided into top and bottom chambers by transverse perforated partitions, the bottom partition being removable, and pipes forming a communication between the boiler and the top portion of the ground coffee receiver.

8. In an apparatus of the class described, an upright boiler which is rectangular in cross section, and in the front top portion of which is a vertically arranged recess, a liquid coffee vessel placed in said recess and rectangular in cross section and the transverse dimensions of which in connection with the transverse dimensions of the top portion of the boiler are equal to the transverse dimensions of the bottom portion of the boiler, a ground coffee receiver detachably placed in the top portion of the liquid coffee vessel and forming a cover therefor, and divided into top and bottom chambers by transverse perforated partitions, the bottom partition being removable, pipes forming a communication between the boiler and the top portion of the ground coffee receiver, means for detachably connecting said pipes with said coffee receiver, and a casing inclosing the boiler and liquid coffee vessel and open at the top and bottom.

9. In an apparatus of the class described, an upright boiler which is rectangular in cross section, and in the front top portion of which is a vertically arranged recess, a liquid coffee vessel placed in said recess and rectangular in cross section and the transverse dimensions of which in connection with the transverse dimensions of the top portion of the boiler are equal to the transverse dimensions of the bottom portion of the boiler, a ground coffee receiver detachably placed in the top portion of the liquid coffee vessel and forming a cover therefor, and divided into top and bottom chambers by transverse perforated partitions, the bottom partition being removable, pipes forming a communication between the boiler and the top portion of the ground coffee receiver, and means for detachably connecting said pipes with said coffee receiver, the entire apparatus being inclosed by a casing between which and the boiler and liquid coffee vessel are air spaces and similar air spaces being formed between the boiler and liquid coffee vessel.

10. An apparatus of the class described, comprising an upright boiler rectangular in cross section and the front top portion of which is removed to form a vertically arranged recess, a plurality of liquid coffee vessels placed in said recess and the transverse area of which together with the transverse area of the top portion of the boiler is equal to the transverse area of the bottom portion of the boiler, ground coffee receivers removably placed in the top of the liquid coffee vessels and forming covers therefor, said coffee receivers being divided into top and bottom chambers by perforated partitions of which the bottom perforated partition is removable, means for supplying water from the boiler to the top portion of said ground coffee receivers, and a casing inclosing the boiler and liquid coffee vessels and open at the top and bottom.

11. An apparatus of the class described, comprising an upright boiler rectangular in cross section and the front top portion of which is removed to form a vertically arranged recess, a plurality of liquid coffee vessels placed in said recess and the transverse area of which together with the transverse area of the top portion of the boiler is equal to the transverse area of the bottom portion of the boiler, ground coffee receivers removably placed in the top of the liquid coffee vessels and forming covers therefor, said coffee receivers being divided into top and bottom chambers by perforated partitions of which the bottom perforated partition is removable, and means for supplying water from the boiler to the top portion of said ground coffee receivers, all of said apparatus being inclosed in a casing between which and the boiler and the ground coffee vessels are air spaces and similar air spaces being formed between the boiler and the liquid coffee vessels.

In testimony that I claim the foregoing as my invention I have signed my name in presence of the subscribing witnesses this 20th day of March, 1907.

CHARLES A. BARWISE.

Witnesses:
C. E. MULREANY,
A. WORDEN GIBBS.